March 22, 1949.  W. A. RAY  2,465,036
VALVE STRUCTURE

Filed Sept. 14, 1943  2 Sheets-Sheet 1

INVENTOR
William A. Ray
BY John Flam
ATTORNEY

March 22, 1949.   W. A. RAY   2,465,036
VALVE STRUCTURE
Filed Sept. 14, 1943   2 Sheets-Sheet 2
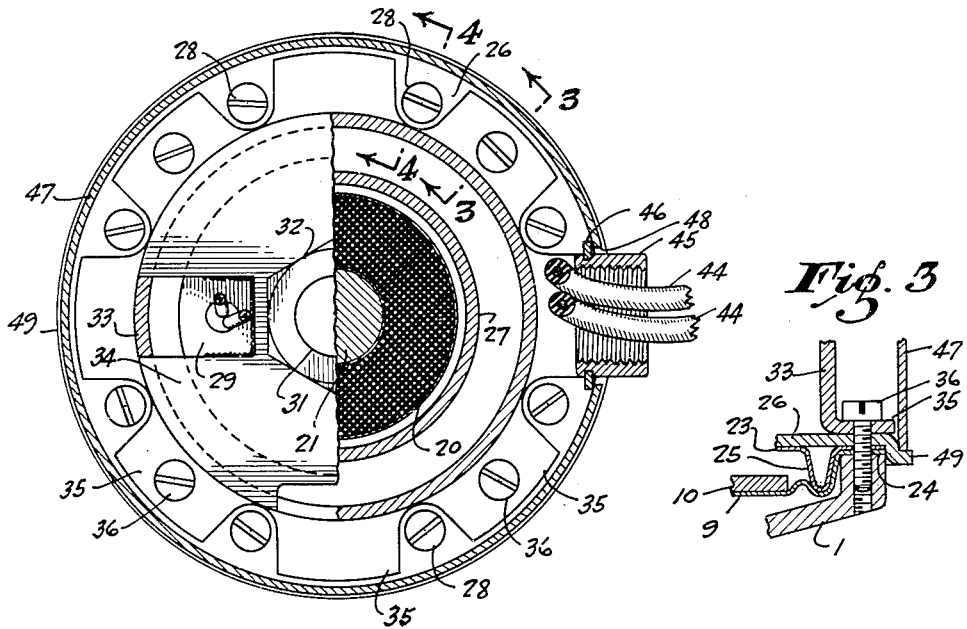
Fig. 2
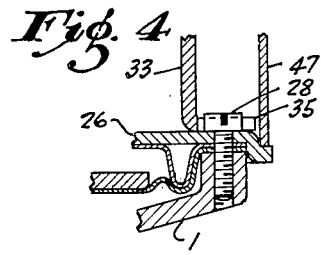
Fig. 3
Fig. 4
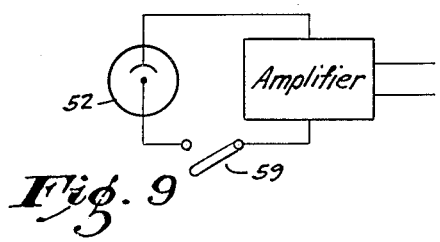
Fig. 8
Fig. 9
INVENTOR
William A Ray
BY John Ham
ATTORNEY

UNITED STATES PATENT OFFICE 2,465,036

VALVE STRUCTURE

William A. Ray, Glendale, Calif., assignor to General Controls Co., a corporation Application September 14, 1943, Serial No. 502,268

3 Claims. (Cl. 137—139)

This invention relates to valves; and more particularly to a valve that is electrically controlled and operated.

It is one of the objects of this invention to improve valves of this character in general.

Such valves may conveniently be operated electromagnetically from commercial alternating current sources, the current passing through an operating coil that magnetically affects a valve closure. When an alternating current magnet is used, care must be taken to reduce the hum, as well as the iron losses, in the magnetic circuit. While it is possible, by appropriate design, to accomplish these results, such designs lead to complications. One way in which these disadvantages may be overcome comprises rectification of the alternating current. In this way, a substantially conventional direct current electromagnet may be used.

It is another object of this invention to provide a compact and efficient valve structure that incorporates the elements required for the rectifying function.

It is still another object of this invention to make it possible easily to assemble the structure or to remove, or replace, the operating parts; and, particularly, to change the operating coil as may be required for different conditions of operation.

One simple form of construction that may be used for the valve parts includes a diaphragm carrying a magnetic disc closure. The closure is arranged so that it may be lifted from a valve seat formed around the port of a wall separating the inlet passage from the outlet passage. In order to isolate the fluid controlled by the valve from the electromagnet, an impervious thin partition is provided between the disc closure and the other parts of the electromagnet. It is another object of this invention to utilize this thin partition for guiding the movement of the diaphragm, thereby increasing the useful life of the diaphragm and yet obviating the necessity of providing special means for supporting the diaphragm at its edge.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general priciples of the invention; but it is to be understood that this detailed description is not to be taken in a limiting sense, since the scope of the invention is best defined by the appended claims.

Referring to the drawings:

Fig. 2 is a sectional view taken along plane 2—2 of Fig. 1; and

Figs. 3 and 4 are fragmentary sectional views taken along correspondingly numbered planes of Fig. 2.

Figure 1:
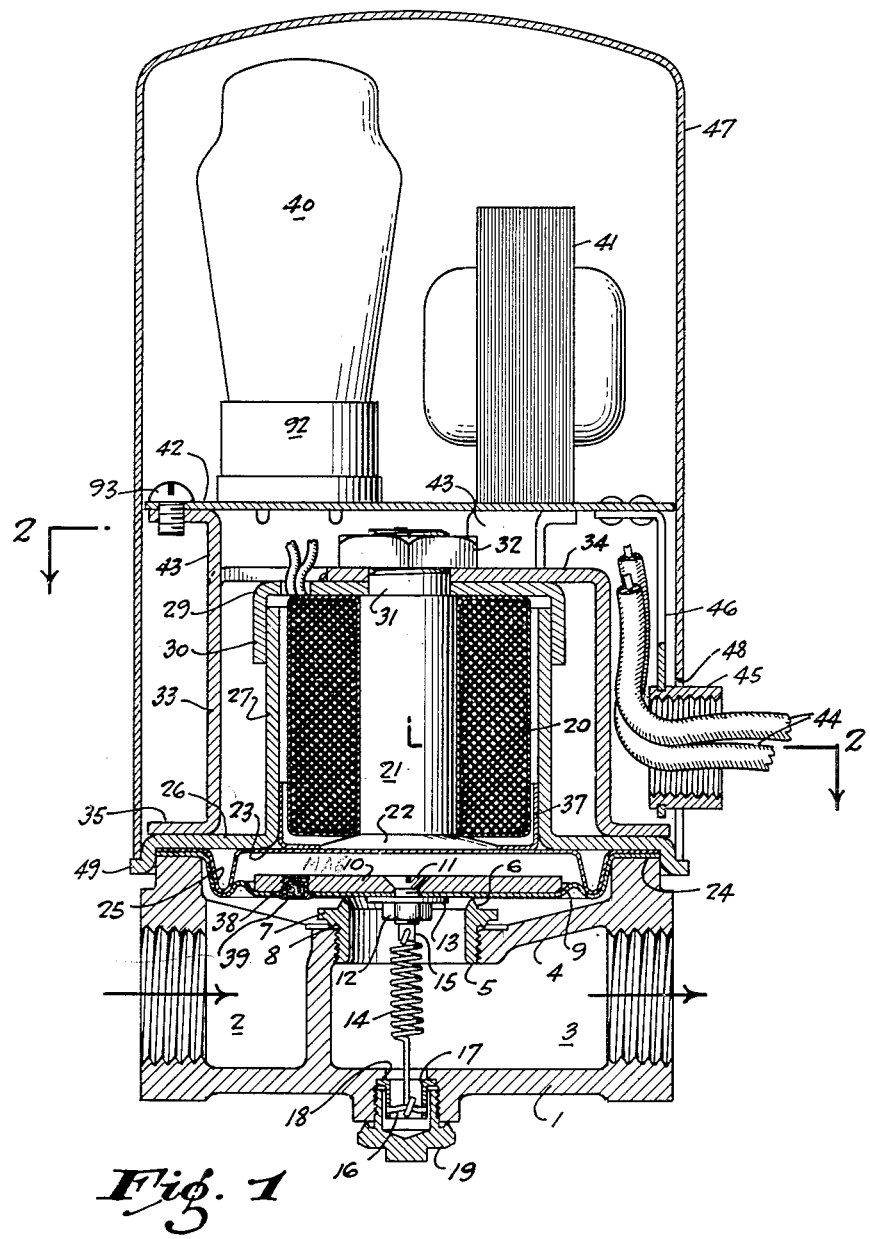
Figure 1 is a longitudinal sectional view of a valve structure embodying the invention.

A valve body 1 is provided having an inlet passageway 2 and an outlet passageway 3. Such valves may be used to control the flow of fluid at relatively low pressures; for example, for transmitting gaseous fuel to a furnace. Passageways 2 and 3 are separated by wall 4 that is provided with a valve port. The port is formed by a hollow member 5 threaded into wall 4. The upper edge of this member 5 forms a thin annular valve seat 6. The flange 7 of member 5 has a downwardly projecting sealing edge 8 engaging the top surface of the wall 4.

In the present instance, a diaphragm type of valve is illustrated. Thus, there is a flexible diaphragm 9, extending over the seat 6. Attached to the central portion of the diaphragm is the disc closure member 10. A flat head screw 11 passes through the center of the disc 10 and through the diaphragm 9 for fastening these two parts together. A nut 12 serves to hold the screw 11 in tight position. A washer 13 of suitable size is interposed between nut 12 and diaphragm 9.

The weight of the disc 10 serves to urge it to closing position. The closing force is assisted by a tension spring 14. The upper end of this spring is anchored in the ear 15 formed at the end of the screw 11. The lower end of the spring 14 is anchored to a cross wire 16 fastened to extend across the hollow bushing 17. This hollow bushing has a flange engaging the edge of the aperture 18, said flange being pulled against the edge of the aperture 18 by the tension of the spring 14. In order to seal the valve body 1 in a fluid-tight manner where the bushing 17 is located, a sealing cap 19 of conventional form may be provided.

The disc 10 is made from magnetic material so that it may be lifted against the force of gravity and of the spring 14. As hereinafter explained, the pressure from the inlet 2 is also effective to urge the disc 10 to closed position.

The electromagnetic means for operating the closure 10 includes a coil 20 that surrounds a magnetic core 21. The manner in which the coil 20 and the core 21 is supported will be hereinafter described.

The core 21 is provided with a lower polar extension, or pole piece, 22, which is joined to the core 21 by a conical surface. The bottom of the polar extension 22 rests upon an impervious thin partition 23 made from non-magnetic material. This partition 23 serves to isolate the elements of the electromagnet from the valve passages, ensuring against leaks or danger or injury to the electromagnet by flow of the fluid being controlled.

Attraction of the disc 10 by the electromagnet causes the diaphragm 9 to flex upwardly. Flexure of the diaphragm, to ensure long life, should be confined to an annular pattern; in this way irregular creasing or pinching may be prevented. In the past, the danger of creasing the diaphragm was obviated by clamping the diaphragm at its edge by a clamp ring disposed above the valve body. The level of the diaphragm edge, when the valve was closed, was at or near that of the valve seat. By the aid of the present arrangement the necessity of providing a separate clamp ring is obviated, and yet the effect is the same as if such a ring were used. For this purpose, the edges of partition 23 and the diaphragm 9 are fastened to the annular surface 24, disposed on the top of the valve body 1. Nevertheless, in order to ensure that flexure of the diaphragm 9 will be guided in the proper manner, the partition 23 is provided with a downwardly extending annular ridge 25. This may be bent in the partition 23 and, although the partition 23 is made of thin material, the ridge 25 exhibits substantial strength. As the diaphragm 9 flexes, it bends around the lower edge of ridge 25. This ridge prevents the outer portions of the diaphragm from flexing irregularly.

The magnetic disc 10, when attracted, serves to bridge the gap between the polar extension 22 and a flange 26 that is formed on a tubular shell 27 of magnetic material. This shell 27 surrounds the coil 21 and forms a part of the magnetic circuit. The flange 26 forms an annular pole around the opposite pole formed by extension 22. Furthermore, the flange 26 may be utilized as illustrated in Fig. 4 as a clamp ring for the edges of the diaphragm 9 and partition 23. For this purpose a plurality of machine screws 28 is provided.

In order to complete the magnetic circuit between the core 21 and tubular member 27, this core is attached to a cap or cover member 29 made of magnetic material. This cover 29 has a depending flange 30 which telescopes over the top of the member 27. The core 21 may be fastened to the cover 28 by the aid of the threaded extension 31 and the nut 32.

Provisions are made for detachably fastening the cover 29 to the shell 27. For this purpose, an external cylindrical member 33 is provided, and which surrounds the member 27. This member 33 has an upper portion 34 which is welded, or otherwise permanently attached, to the top of the cover 29. The annular member 33 is also made of magnetic material and forms a part of the magnetic circuit. It is provided at its lower edge with a flange 35. This flange overlies the flange 26. It is arranged, however, to be independently fastened to the valve body 1, as by the aid of the screws 36. The flange 35 is interrupted, as shown most clearly in Figs. 2 and 4, so that screws 28 may be used for independently fastening the member 27 in place without attaching the flange 35 to the body 1.

In this way, if it is desired to remove the core 21 and the associated coil 20, screws 36 only are removed. When this is accomplished, the member 33, with cover 29 and the core 21, may be removed as a unit, the shell 27 being left attached to the body. The coil 20 is also removed with this assembly, since it is held against the top of cover 29 by the polar extension 22. Accordingly, removal and replacement of the coil 20 are relatively simple.

Should it be desirable to reinforce the thin partition 23 against stresses imposed by the pressure of the fluid under control, this may be accomplished by the aid of a reinforcing angle 37, disposed in the form of an annulus around the lower inner edge of the member 27 and attached thereo. Furthermore, in order to utilize the pressure of the fluid being controlled to hold the disc 10 against the seat 6, a port 38 is provided through the disc 10. This port may be provided with a filter or strainer device 39. Fluid under pressure from the inlet side may pass through this strainer to the space above the disc 10.

It is desirable, as heretofore stated, to operate the electromagnet coil 20 by direct current. For this purpose, use is made of a rectifier device associated with the valve. This device may conveniently be in the form of an electronic rectifying tube 40, its connecting base 92, and other apparatus such as a transformer 41. These are conveniently supported on a platform or base 42 disposed immediately above the electromagnet. This base 42 is in the form of a thin disc supported upon three brackets 43 that are stamped out of the member 33 and that are bent to form supporting brackets.

Connections for the rectifier device and coil 20 are indicated by the leads 44 passing through a bushing 45. This bushing 45 is shown as attached to a bracket 46 depending from the base 42. By supporting the rectifier device in this way, it, too, is removable along with the cover or cap 30. It may, however, be independently removed with base 42 by removal of the screws 93 that attach base 42 to the brackets 43.

A removable cover 47 is used to enclose the rectifier device and the electromagnet. This cover is slotted, as indicated at 48, to permit its lower edge to be passed downwardly beyond the bushing 45. The lower edge rests upon a shoulder 49 formed on the flange 26. No special provisions may be made for retaining the cover 47 in place, ordinary friction between its lower edge and the outer edge of flange 26 being sufficient for this purpose.

The inventor claims:

1. In a valve structure, a valve body in which a valve closure seat is provided, a magnetic closure member co-operating with said seat, a magnetic frame, said frame having a flange for attaching the frame to the body, as well as a tubular portion extending above the flange, a core, means for detachably mounting the core in the tubular portion, said means including a magnetic cover for the tubular portion, as well as a wall surrounding the tubular portion and detchably supported on the body, said core and the flange forming magnetic poles for influencing said closure member, a coil mounted on the core and removable as a unit with said core, a bracket fastened to the wall that surrounds the tubular portion, said bracket extending over the magnetic frame, an electronic rectifying device supported on said bracket, for supplying current to the coil, and a cover enclosing the frame and the rectifying device, said cover having a lower edge that rests on a shoulder formed on the flange of the frame.

2. In a valve structure, a valve body in which a valve closure seat is provided, a magnetic closure member co-operating with said seat, a non-magnetic impervious thin partition above the closure member and sealing the body, a diaphragm upon which the magnetic closure member is supported, means external of the partition for magnetically influencing said closure member, the edge of the diaphragm and the edge of the partition being contiguous, and a common means for fastening said edges to the valve body, said partition having a downwardly extending annular portion around which the diaphragm extends.

3. In a valve structure, a valve body in which a valve closure seat is provided, a magnetic closure member co-operating with said seat, a non-magnetic impervious thin partition above the closure member and sealing the body, means external of the partition for magnetically influencing said closure member, a diaphragm upon which the closure member is supported, said partition and said diaphragm being substantially coextensive, and means for fastening the edges of the partition and of the diaphragm to the valve body, said partition having a downwardly extending annular portion around which the diaphragm extends.

WILLIAM A. RAY.

REFERENCES CITED

The following references are of record in the file of this patent:

UNITED STATES PATENTS

| Number | Name | Date |
|---|---|---|
| 9,107 | Ware | July 6, 1852 |
| 930,177 | Hauss | Aug. 3, 1909 |
| 1,717,247 | Perry | June 11, 1929 |
| 1,970,579 | Schweitzer | Aug. 21, 1934 |
| 2,207,097 | Logan | July 9, 1940 |
| 2,321,853 | Ray | June 15, 1943 |
| 2,332,108 | Paille | Oct. 19, 1943 |
| 2,358,828 | Ray | Sept. 26, 1944 |
| 2,373,788 | Silvertsen | Apr. 17, 1945 |

FOREIGN PATENTS

| Number | Country | Date |
|---|---|---|
| 16,513 | Great Britain | 1907 |
| 402,826 | Great Britain | Dec. 11, 1933 |